United States Patent [19]

Maier et al.

[11] Patent Number: 5,680,924
[45] Date of Patent: Oct. 28, 1997

[54] CARRIAGE CHAIN FOR A SORTING SYSTEM

[75] Inventors: Willi Maier, Kloten; Thomas Rohner, Zuerich, both of Switzerland

[73] Assignee: Grapha-Holding AG, Hergiswil, Switzerland

[21] Appl. No.: 596,120

[22] PCT Filed: May 26, 1995

[86] PCT No.: PCT/CH95/00119

§ 371 Date: Feb. 8, 1996

§ 102(e) Date: Feb. 8, 1996

[87] PCT Pub. No.: WO95/33669

PCT Pub. Date: Dec. 14, 1995

[30] Foreign Application Priority Data

Jun. 8, 1994 [CH] Switzerland ............... 01 797/94

[51] Int. Cl.⁶ ........................................ B65G 39/20
[52] U.S. Cl. ........................... 198/845; 198/850
[58] Field of Search ........................ 198/850, 845, 198/851, 778, 370.04

[56] References Cited

U.S. PATENT DOCUMENTS

| | | | |
|---|---|---|---|
| 4,139,088 | 2/1979 | Olesen | 198/370.04 |
| 4,278,165 | 7/1981 | Nielsen et al. | 198/370.04 |
| 4,378,062 | 3/1983 | Macrum | 198/370.04 |
| 5,009,302 | 4/1991 | Sansevero | 198/778 X |
| 5,135,102 | 8/1992 | Sjogren et al. | |
| 5,335,767 | 8/1994 | Killer et al. | |

FOREIGN PATENT DOCUMENTS

| | | |
|---|---|---|
| 0540464 | 5/1993 | European Pat. Off. |
| 0588378 | 3/1994 | European Pat. Off. |
| 916431 | 12/1946 | France. |
| 2054503 | 2/1981 | United Kingdom. |

*Primary Examiner*—D. Glenn Dayoan
*Attorney, Agent, or Firm*—Spencer & Frank

[57] ABSTRACT

Each carriage (1) of a carriage chain has a running gear (5) at one end that has two running rollers (18) and two guide rollers (19). At the opposite end, it is coupled with the preceding carriage (1) by way of a spherical bearing (25) and a rod (26) which is guided so as to be longitudinally displaceable in this carriage. Toothed racks (8) disposed on the underside of the carriage body (3) and connected directly to each other by way of joint rods (10) serve in driving.

7 Claims, 1 Drawing Sheet

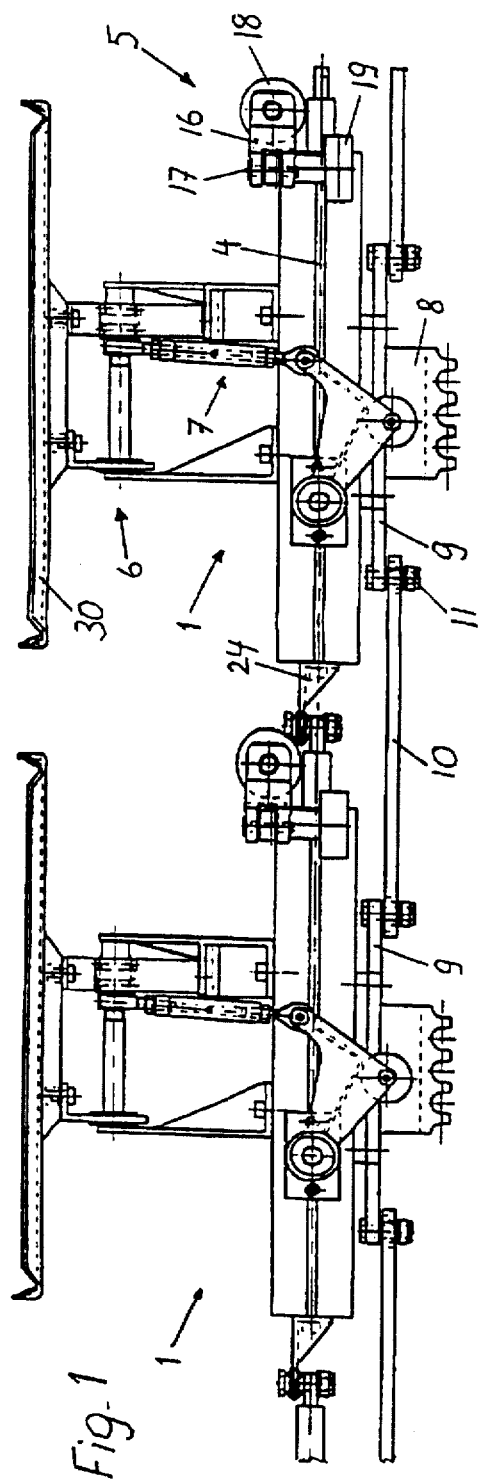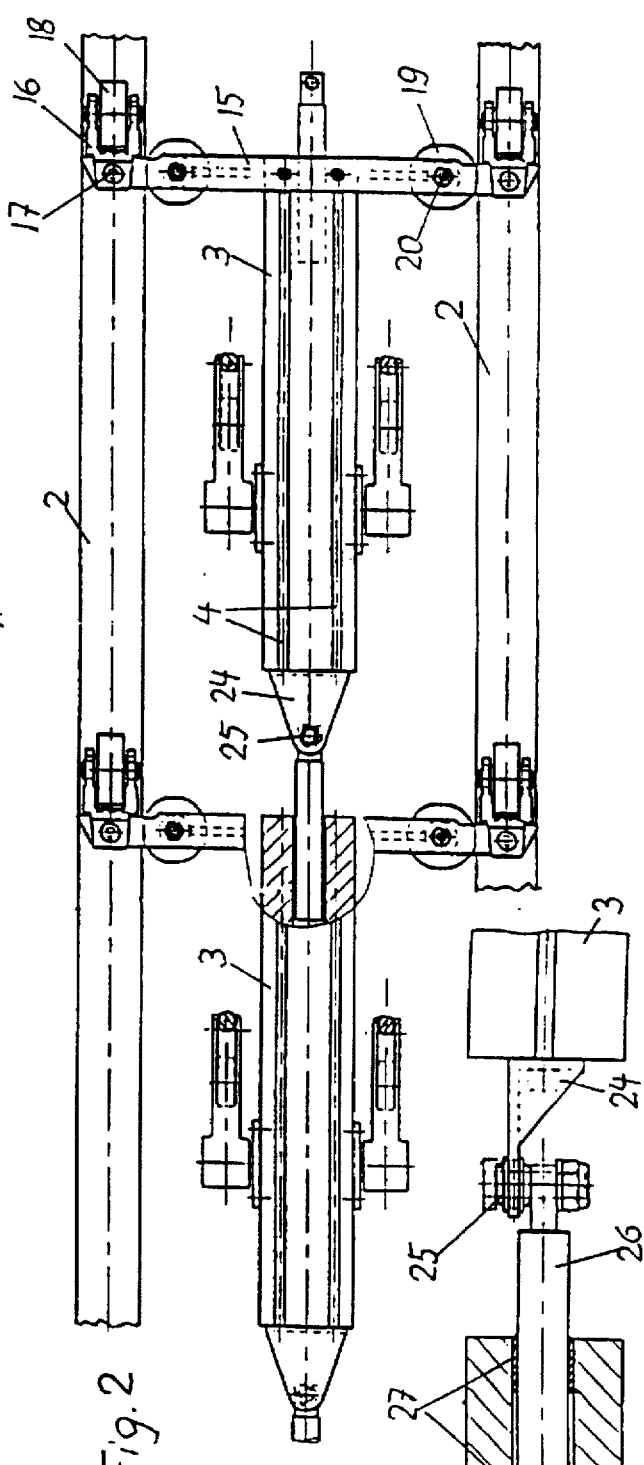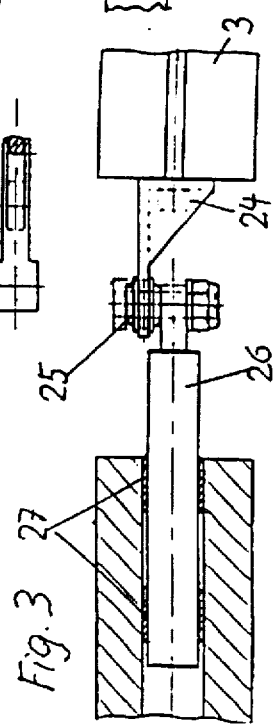

CARRIAGE CHAIN FOR A SORTING SYSTEM

EP-A-588 378 describes a sorting system having an endless carriage chain comprising carriages which are coupled with each other. Each carriage has running rollers at one end and is hinged to the next consecutive carriage. On the underside, the carriages have electrically-conductive plates which, together with stationary coils, form a linear motor for driving the carriage chain. This linear motor is rather loud during operation.

A further sorting system, in which the carriages have four running rollers and lateral guide rollers and are connected to each other by way of joint rods, is described in EP-A-540 464. For driving, a toothed rack which engages a circulating, driven chain at at least one location in the carriage chain is secured beneath each carriage. This system can be constructed such that it produces less noise during operation than the first-cited system. However, the carriages are costly to produce.

The object of the present invention is to disclose a carriage chain for a sorting system which runs quietly and can be produced inexpensively. This object is accomplished by the combination of features according to the claims.

An embodiment of the invention is described below in conjunction with the drawings. Shown therein are: FIG. 1 a side view of two carriages of a carriage chain, FIG. 2 a plan view of the carriage chain with the superstructure removed, and FIG. 3 an enlarged section through a coupling.

The carriage chain comprises an endless series of carriages 1 coupled with each other and guided on two pipes 2 (not shown in FIG. 1) as guide rails. Each carriage 1 has a carriage body 3, which is preferably configured as a rectangular hollow profile having undercut longitudinal grooves 4 for attachment of the moving gear 5, the superstructure 6, the operating device 7 and a toothed rack 8 on the underside. The toothed racks 8 have extensions 9 in the longitudinal direction of the carriage 1. The extensions 9 of adjacent carriages are coupled directly with each other by way of spherical bearings.

Each carriage has the moving gear 5 at one end. Prongs 16 are secured, so as to pivot to a limited extent about vertical axes 17, to both ends of a transverse rod 15 secured to the carriage body 3. A running roller 18 is rotatably seated in each of the prongs 16. By means of this configuration, the running rollers 18 act as guide rollers which roll on the pipes 2 in curves without slipping laterally. This keeps the wear by friction of the rollers 18 low and serves to achieve quiet running. Two lateral guide rollers 19, which roll on the insides of the pipes 2, are further seated on the transverse rod 15 so as to rotate about vertical axes 20.

At the opposite end, a carrier 24 is secured to the carriage body 3 by way of a spherical bearing 25. The inside part of the bearing 25 is secured to the free end of a cylindrical rod 26 which is seated to be longitudinally displaceable and rotatable in bearing bushes 27. The bearing bushes 27 are inserted into the end face of the carriage body 3 of the preceding carriage, which carries the running gear 5. The longitudinal displaceability and rotatability of the rods 26 permit compensation in length in the transition to ascents and curves, as well as negotiation of helical ascents. Because of the direct coupling of the toothed racks 8 with the joint rods, the carriage body 3 does not need to transmit tensile and pressure forces. It can therefore be built to be very lightweight. Moreover, the described embodiment makes it possible for only the lengths of the joint rods 10 to have to be changed within specific limits, stipulated by the length of the rods 26 protruding beyond both sides of the bearing bushes 27, when the carriage division is changed, for example when shorter or longer trays 30 of the superstructure 6 are mounted. This makes the system very flexible.

The superstructure 6 having the bearing shell 30 and the operating device 7 are not the subject of this application, and are therefore not described in detail. They can be configured in accordance with, for example, EP-A-540 464.

We claim:

1. Carriage chain for a sorting system, comprising a plurality of carriages (1) coupled with one another and each having a carriage body (3) which includes a running gear (5) at one end that has two running rollers (18) and at least one lateral guide roller (19) and, at the opposite end, a coupling apparatus (24–27) by way of which the carriage body is coupled with an adjacent carriage (1), wherein a toothed rack (8) for driving the carriage chain is secured to the underside of the carriage body (3), wherein the toothed racks (8) of adjacent carriages (1) are coupled directly with each other by means of joint rods (10), and wherein the coupling apparatus (24–27) encompasses a rod (26) which is seated in a first carriage body (1) so as to be longitudinally displaceable and whose end is hinged to an adjacent, second carriage body (3).

2. Carriage chain according to claim 1, wherein the rod (26) is connected to the second carriage body (3) by way of a spherical bearing (25).

3. Carriage chain according to claim 1, wherein the rod (26) is circular-cylindrical and is seated so as to be longitudinally displaceable and rotatable in the first carriage body (3).

4. Carriage chain according to claim 1, wherein the joint rods (10) are coupled with the toothed racks (8), at least on one side, by way of a spherical bearing (11).

5. Carriage chain according to claim 1, wherein the running rollers (18) are seated so as to pivot to a limited extent about vertical axes (17).

6. Carriage chain according to claim 1, wherein the carriage body (3) is configured as a rectangular hollow profile having undercut longitudinal grooves (4).

7. Carriage chain according to claim 1, wherein the running gear (5) includes two lateral guide rollers (19).

* * * * *